United States Patent [19]

Bryant

[11] Patent Number: 4,648,631

[45] Date of Patent: Mar. 10, 1987

[54] REDUCING COUPLING

[75] Inventor: Donald L. Bryant, Texarkana, Ark.

[73] Assignee: Rockwell International Corporation, Pittsburgh, Pa.

[21] Appl. No.: 810,637

[22] Filed: Dec. 19, 1985

[51] Int. Cl.$^4$ ............................................. F16L 23/00
[52] U.S. Cl. ................................... 285/177; 285/337; 285/368
[58] Field of Search ............... 285/177, 337, 348, 372, 285/368

[56]                References Cited
            U.S. PATENT DOCUMENTS

| | | | |
|---|---|---|---|
| 1,447,192 | 3/1923 | Watson | 285/337 |
| 1,671,789 | 5/1928 | Smith | 285/337 X |
| 2,288,225 | 6/1942 | Boughton | 285/337 X |
| 3,782,683 | 1/1974 | Lee et al. | 285/337 X |

FOREIGN PATENT DOCUMENTS

| | | | |
|---|---|---|---|
| 546005 | 9/1957 | Canada | 285/337 |
| 718275 | 11/1954 | United Kingdom | 285/337 |

Primary Examiner—Thomas F. Callaghan

[57]                ABSTRACT

A coupling for connecting the ends of two pipes of different diameters comprised of a body member having a radially extending wall and sleeve portions which extend in opposite directions from the radial wall. Each sleeve portion has associated with it a series of bolts extending from ears or lugs on the sleeve portion to followers which engage sealing rings. The bolt heads at each of the sleeve portions are arranged adjacent to and are circumferentially aligned with each other so that during installation the bolt heads used on the larger diameter sleeve prevent the bolt heads mounted on the sleeve of smaller diameter from falling out of their slots wherein field installation is greatly facilitated.

4 Claims, 3 Drawing Figures 4,648,631

REDUCING COUPLING

BACKGROUND OF THE INVENTION

1. Field of the Invention

This invention relates to couplings for pipelines and in particular couplings for connecting pipelines of a different diameter.

2. Description of the Prior Art

Couplings of the general type with which this invention is concerned are shown in U.S. patents to Smith U.S. Pat. No. 2,681,816 to Burnett U.S. Pat. No. 4,494,780 and are particularly exemplified by the reducing coupling shown in Bulletin CC 431 8/81 published by Rockwell International Corporation, which will be described in detail hereinafter. The couplings exemplified by this prior art are unnecessarily complicated, expensive to manufacture and difficult to install in the field.

SUMMARY OF THE INVENTION

Accordingly, the invention herein disclosed provides a coupling in which the cost to manufacture is significantly reduced over the couplings of the prior art and easy to install in the field. It is comprised of a body member from which coaxial sleeve portions project in opposite directions, the sleeve portions being of differing diameters to receive pipes of differing diameters. Each sleeve portion has associated with it a series of bolts extending from ears or lugs on the sleeve portion to followers. When the bolts are tightened a sealing ring is compressed between the follower, the sleeve portion and the pipe, which is telescopically received into the sleeve portions. By this arrangement, standard size followers may be employed which not only significantly reduces manufacturing costs but also reduces the amount of inventory that must be maintained, both by the manufacturer and its distributors. The bolt heads at each of the sleeve portions are arranged adjacent to and are circumferentially aligned with each other so that during installation the bolt heads used on the larger diameter sleeve prevent the bolt heads mounted on the sleeve of smaller diameter from falling out of their slots whereby field installation is greatly facilitated.

DESCRIPTION OF THE PREFERRED EMBODIMENT

Figure 1:
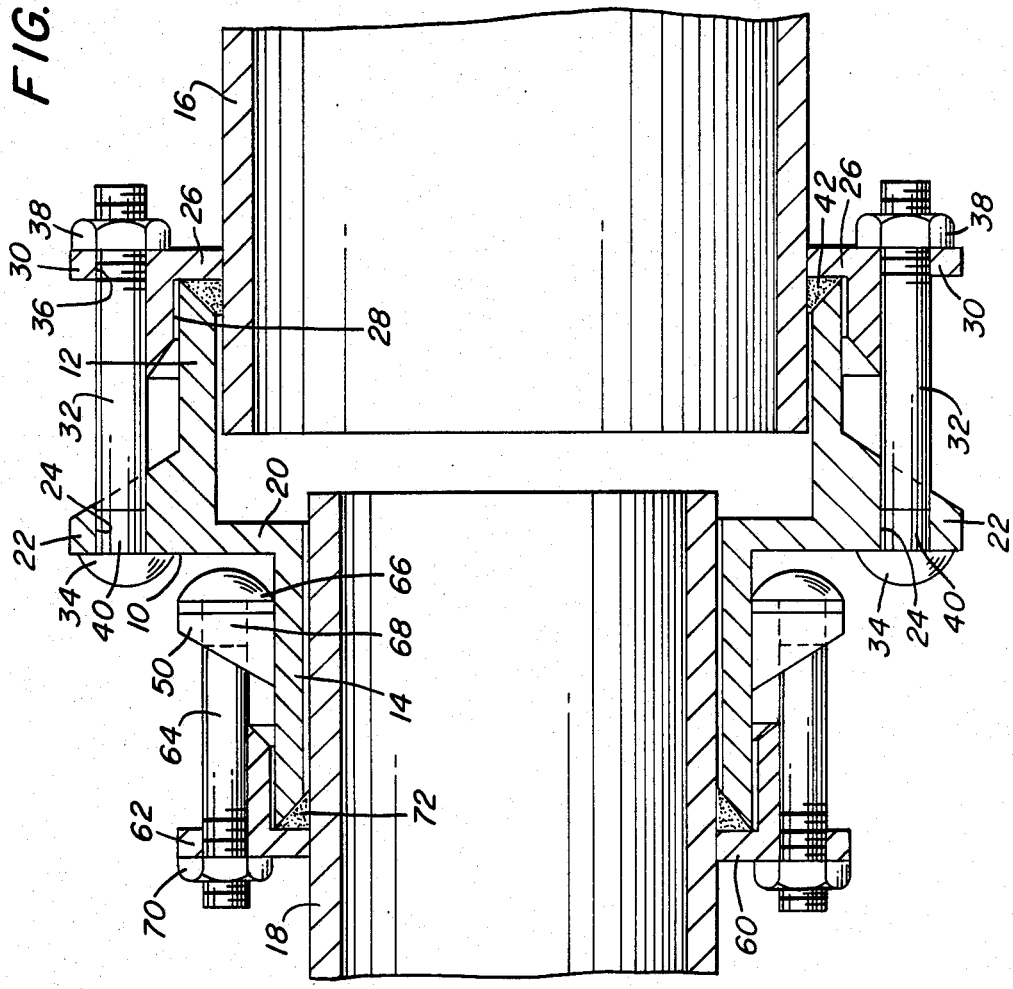
FIG. 1 is an elevation cross section of the invention herein described.
Figure 2:
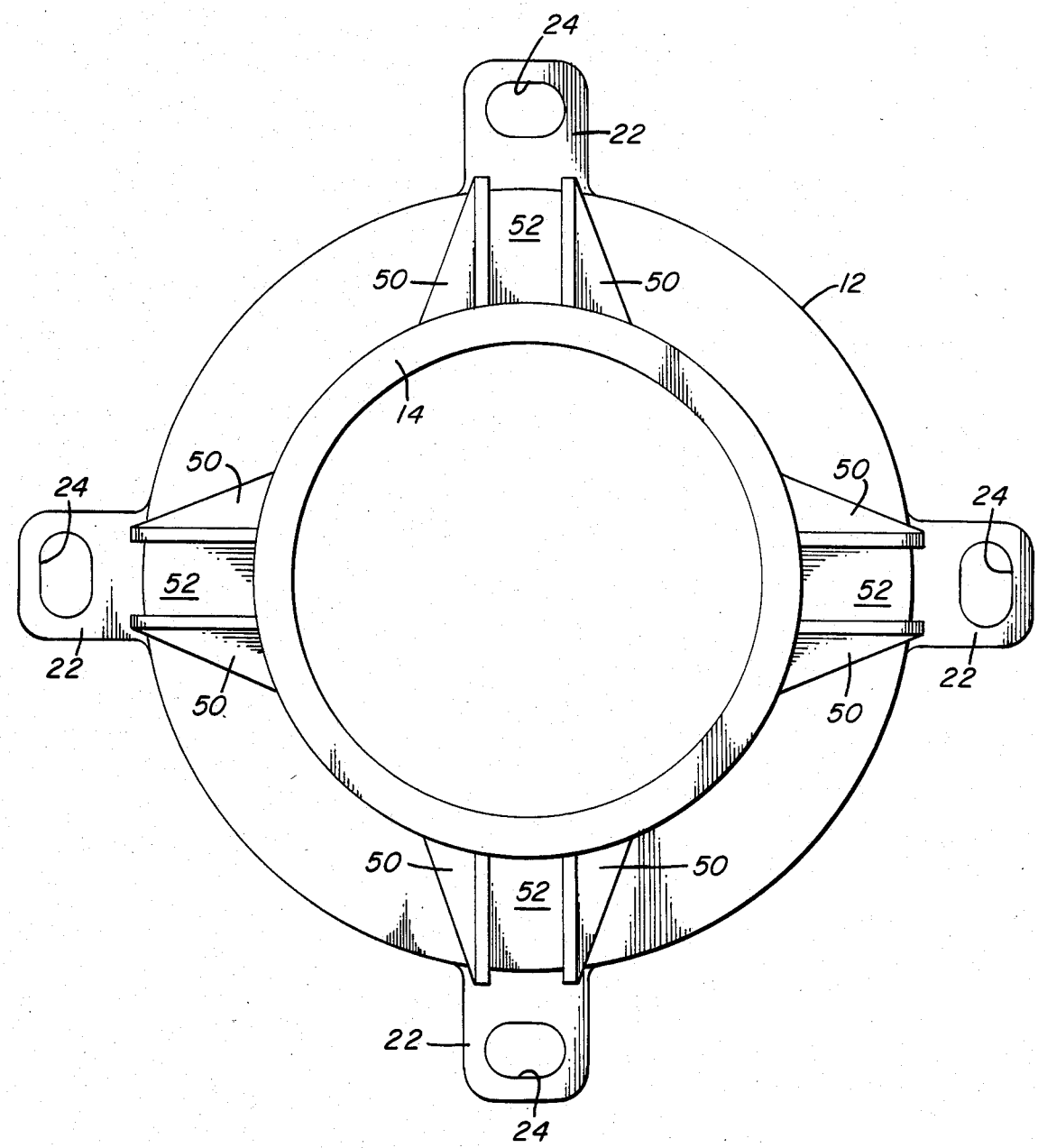
FIG. 2 is a view from the left of FIG. 1 showing the body of the coupling with the bolts and followers removed.

As shown in FIGS. 1 and 2 a main body 10 is comprised of large sleeve portion 12 and a reduced sleeve portion 14 which are coaxial with each other and project axially in opposite directions. Sleeve portion 12 telescopically receives the end of pipe 16 while sleeve portion 14 telescopically receive pipe 18 which is of lesser diameter than pipe 16. Sleeve portions 12 and 14 are joined by radially extending flange 20.

Radially projecting from sleeve portion 12 are four circumferentially spaced ears 22 each of which has an oval shaped opening 24 as best shown in FIG. 2. A follower 26 is received around the periphery of pipe 16 and has an enlarged bore 28 into which is received the end of sleeve 12. Projecting radially from the follower 26 are four circumferentially spaced ears 30 which are axially aligned with respective ears 22 on the sleeve 12. Bolts 32 having heads 34 project through openings 24 in the ears 22 and through aligned openings 36 in ears 30 on follower 26. Nuts 38 are threaded end of the bolts 32. Adjacent their head portion the bolts 32 have a portion 40 which is of oval shape cross section and is received in the oval shaped openings 24 in the ears 22. Thus, the bolt is prevented from rotating about its axis as the nuts 38 are tightened. As the nuts 38 are tightened a resilient seal ring 42 is compressed between the follower 26, the end of sleeve 12 and the exterior of pipe 16 to provide a fluid tight seal between the pipe 16 and the sleeve 12 and follower 26.

A plurality of circumferentially spaced sets of two lugs 50 project radially from the exterior of sleeve 14 and are closely adjacent wall 20. A follower 60 corresponding to the diameter of pipe 18 is telescopically received on pipe 18 and has circumferentially spaced radially projecting ears 62. The ears 62 have openings 64 which are aligned with the respective spaces 52 between each set of lugs 50. Bolts 64 are received in the slot 52 between the sets of lugs 50, and have a threaded end which projects through opening 64 in follower 62. The head portion 66 of each bolt is adjacent the head portion 34 of bolts 32. Also the bolts 64 have a portion 68 of oval shape cross section adjacent the head 66 which is received in slot 52. The slots 52 between the lugs of each set are of such dimension so as to snugly receive the minor dimension of the portion 68 to prevent the bolts from rotating when the nuts 70 are tightened. As the nuts 70 are tightened a resilient seal ring 72 is compressed between the follower 60, the end of sleeve 14 and the exterior of pipe 18. The space between the lugs 68 and the wall 20 is large enough to accommodate the heads 66 of bolts 64 but is preferably less than the sum of the axial dimensions of heads of respective ones of bolts 32 and 64. Also each set of lugs 50 is circumferentially aligned with a corresponding ear 22.

In the preferred method of assembly the entire coupling comprised of the body 10, followers 26 and 60, bolts 32, nuts 38 and bolts 64 and nuts 70 and seal rings 42 and 72 are all loosely assembled before being mounted on either of the pipes. In doing this, the bolts 64 would first be inserted into the spaces 52 between each set of lugs 68 and the follower 62 with seal ring 72 secured thereto. The bolts 32 would then be inserted through openings 24 in ears 22 and the follower 26 with seal 42 secured thereto. The follower 26 and seal 42 and sleeve 12 may then be telescopically mounted on the end of the larger pipe 16. During this procedure because of the close axial spacing between and the circumferential alignment of the sets of lugs 50 and the ears 22, the bolts 64 will be prevented from dropping out of the slots 52 by the heads 34 of the bolts 32. The smaller of the two pipes 18 may then be inserted through the follower 60 and into the sleeve 14 after which the nuts 38 may be tightened on bolts 32 and nuts 70 tightened down on bolts 64 to provide a rigid fluid tight sealed connection between the two pipes 16 and 18.

Figure 3:
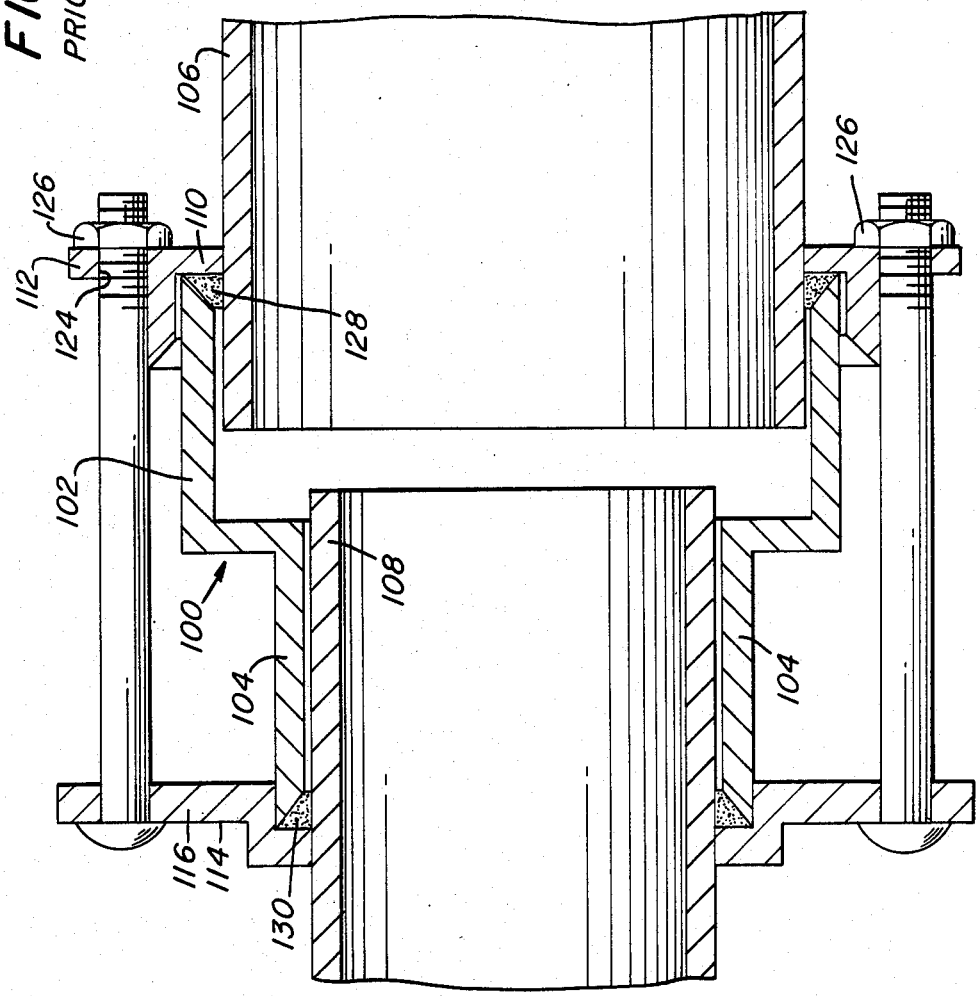
FIG. 3 is an elevation cross section of a typical prior art reducing couplings now in current use.

FIG. 3 shows a typical prior art reducing coupling as also shown in the aforementioned Bulletin CC 431 8/81. In that arrangement a coupling body 100 has axially extending sleeves 102 and 104 which respectively are adapted to receive pipes 106 and 108. A follower 110 is telescopically mounted on pipe 106 and has circumferentially spaced radially extending ears 112. A follower 114 having a radially extending flange 116 is mounted on the end of smaller pipe 108 and is telescopically received over the end of sleeve 104. Bolts 120 project through aligned openings 122 and 124 in flange 116 and ears 112 respectively. As the nuts 126 are tightened, seal rings 128 and 130 are sealingly compressed between follower 110 and sleeve 102 and exterior pipe 106 and ring 130 is compressed between sleeve 104, follower 114 and the exterior of pipe 108.

In the prior art coupling of FIG. 3 it will be noted that follower 114 has an extended flange 116 which was made necessary in order to provide axial alignment between the openings 122 in the flange 116 and openings 124 in the ears 112. Manufacturers of pipe coupling devices customarily manufacture and market couplings for joining the ends of pipes of the same diameter similar to those shown in the aforementioned Bulletin CC 431 8/81, as well as reducing couplings. In such straight couplings, the body or sleeve of the coupling which bridges the ends of the two pipes to be coupled is of a uniform diameter and the followers employed at either end of the sleeve are also of the same diameter. Since straight couplings of various standard sizes are normally provided, followers of comparable standard sizes are also produced and carried in inventory. While the coupling of FIG. 3 employs one follower 110 of a standard size it will be appreciated that the standard follower which would normally be used on straight couplings for coupling pipes of the size of pipe 108 could not be used in a reducing coupling because the bolt openings in the standard follower normally used for pipes of the size of pipe 108 would not be axially aligned with openings 124 in follower 112. Thus, in the prior art device it is necessary to provide a specially designed follower 114 which has radially extending flange 116. This of course adds to the expense of the follower in that not only does the follower 116 have to be produced, usually in lesser quantities than the standard size followers, but it must be carried as a special item of inventory in the manufacturer's as well as the distributor's inventory.

On the other hand, both the followers 26 and 80 of FIGS. 1 and 2 may be of standard size which are provided for use with straight couplers for coupling pipes of the same diameter. In order to utilize standard size followers, however, it is necessary to form the sets of lugs 50 on the sleeve portion 14 so that they are essentially in axial alignment with the bolt holes on the standard follower 60 used with straight couplings of the same size as the sleeve 14 and therefore of a standard size.

In order to maintain axial compactness for the body 20 it is desirable that the lugs 50 be formed as close as possible to the radial wall 20 of the body 10. Since deep socket ratchet wrenches are customarily used in installing these couplings onto the pipes in the field, the heads 66 of the bolts 64 are located as shown adjacent the wall 20. If the bolts were reversed and the threaded ends located at the wall 20 there would be no room for the sockets of ratchet wrenches between the lugs 50 and the wall 20. To provide sufficient space between the lug 50 and wall 20 to accommodate the deep sockets would unduly extend the length of body of the coupling and increase the cost thereof. However, in order to facilitate assembly of the bolts 64 onto the reduced portion of the sleeve, spaced lugs 50 with an open ended slot 52 are provided so that the bolts may be laid into the slots before bolts 32 are inserted into openings 24. In assembly the portion 68 of the bolts 64 are first inserted into the spaces 52 and the follower is then mounted onto the threaded end of the bolts. Since each set of lugs 50 and space 52 is circumferentially aligned with a respective ear 22, the bolt heads 34 and 66 are also circumferentially aligned. The axial spacing between the lug sets 50 and the wall 20 is less than the sum of the axial lengths of the bolt heads 34 and 66, and since the bolt heads 34 and 36 are circumferentially aligned in the assembly, the head ends of the bolts 64 are prevented from dropping out of the slots 52 by the heads of bolts 34. Therefore, by providing two sets of bolt retainers one on the larger sleeve and one on the lower sleeve, by providing open ended slots to receive the head portion of the bolts on the smaller sleeve, by radially aligning the bolt head retainers on the smaller sleeve with the bolt retainers on the larger sleeve and by locating the bolt head retainers on the lower sleeve closely adjacent to the bolt retainer on the larger sleeve, Applicant has provided a reducing sleeve which eliminates the need for a special follower for the smaller sleeve. While the arrangement requires two sets of bolts instead of one, the bolts are shorter and the cost advantage gained by utilizing standard followers with the smaller sleeve significantly outweighs the cost of providing two sets of smaller bolts.

In an alternate embodiment, particularly in large sizes of reducer couplings, the number of ears 22 may exceed the number of sets of lugs 50. For example, in such larger sizes six of the ears may be equally circumferentially spaced around the sleeve 12. In such cases only one of the ears 22 will be circumferentially aligned with one of the sets of lugs 50. However, even in such a case the benefits of the invention will still be realized since the ear 22 and lug set 50 which are aligned will be oriented in the lowermost position during installation. The other sets of lugs 50 will not open downwardly and therefore the bolts received within the spaces 52 will not be prone to be inadvertently dropped out of the spaces during installation.

I claim:

1. A coupling for connecting the ends of two pipes of different diameters comprised of a body having a radially extending wall, first and second sleeve portions axially extending in opposite directions from said wall, said first sleeve portion being adapted to telescopically receive the end of the larger of the two pipes and said second sleeve portion being adapted to telescopically receive the end of the smaller of said pipes, a plurality of circumferentially spaced ears projecting radially outward from the periphery of said first sleeve portion at said wall, openings through said ears, a plurality of circumferentially spaced sets of two lugs projecting radially outward from the periphery of said second sleeve portion closely adjacent said wall, the space between the two lugs in each set opening radially outward, first and second followers associated respectively with ends of said first and second sleeve portions, first and second series of bolts extending from said ears and lugs to respective followers associated with said first and second sleeve portions, the heads of said first and second series of bolts being adjacent said ears and said lugs respectively, said ears and said lugs are axially spaced a distance less than the sum of the axial length of a bolt head in said first series of bolts and the axial length of the bolt head in the second series of bolts which is circumferentially align therewith, and at least one of said ears is circumferentially aligned with one of said sets of lugs.

2. The coupling defined in claim 1 in which said ears are circumferentially aligned with respective sets of lugs.

3. The coupling defined in claim 2 in which the portion of the bolts adjacent their heads is of oval cross section, the minor diameter of which is snugly received in the openings through said ears and between said lugs respectively.

4. The coupling defined in claim 2 in which said first and second sleeve portions are coaxial.

* * * * *